United States Patent [19]

Vornberger

[11] Patent Number: 4,530,455
[45] Date of Patent: Jul. 23, 1985

[54] PISTON AND DRIVER

[75] Inventor: George F. Vornberger, Cincinnati, Ohio

[73] Assignee: Senco Products, Inc., Cincinnati, Ohio

[21] Appl. No.: 522,645

[22] Filed: Aug. 11, 1983

[51] Int. Cl.³ .......................... B25C 1/04; B25C 7/00
[52] U.S. Cl. ................................. 227/130; 227/120; 173/127
[58] Field of Search .............. 227/81, 120, 130, 137, 227/156; 173/126, 127

[56] References Cited

U.S. PATENT DOCUMENTS

| | | | |
|---|---|---|---|
| 2,682,052 | 6/1954 | Juilfs | 227/130 X |
| 2,682,658 | 7/1954 | Hoeflich | 227/130 |
| 2,687,522 | 8/1954 | Juilfs | 227/130 X |
| 2,741,518 | 4/1956 | Leman | 309/4 |
| 2,887,682 | 5/1959 | Wandel et al. | 227/130 |
| 2,918,675 | 12/1959 | Smith | 173/127 X |
| 2,943,327 | 7/1960 | Juilfs | 227/130 |
| 2,960,067 | 11/1960 | Osborne | 227/130 X |
| 2,995,113 | 8/1961 | Steiner | 173/127 X |
| 3,051,135 | 8/1962 | Smith | 227/130 X |
| 3,063,421 | 11/1962 | Fisher | 227/130 X |
| 3,094,043 | 6/1963 | Powers et al. | 227/130 X |
| 3,099,012 | 7/1963 | Wandel | 227/130 X |
| 3,102,455 | 9/1963 | Breitenstein | 92/155 |
| 3,106,134 | 10/1963 | Osborne | 227/130 |
| 3,107,584 | 10/1963 | Powers | 92/85 |
| 3,170,487 | 2/1965 | Juilfs et al. | 137/625.6 |
| 3,232,186 | 2/1966 | Garrett et al. | 92/172 |
| 3,338,141 | 8/1967 | Ramsay | 92/30 |
| 3,447,426 | 6/1969 | Obergfell | 92/175 |
| 3,703,125 | 11/1972 | Pauliukonis | 92/85 |
| 4,096,787 | 6/1978 | Sandau et al. | 92/260 |
| 4,182,012 | 1/1980 | Block | 29/156.5 A |
| 4,384,623 | 5/1983 | Golloni | 173/127 |

Primary Examiner—Paul A. Bell
Attorney, Agent, or Firm—Wood, Herron & Evans

[57] ABSTRACT

An improved piston and driver structure includes a synthetic piston body, a bifurcated piston insert and a driver secured within the insert by means of a pin and by means of frictional engagement of the driver by the piston insert when the insert is assembled to the piston body. The piston insert has an enlarged top for dissipating operating pressures over the piston body.

19 Claims, 3 Drawing Figures

PISTON AND DRIVER

This invention relates to pistons for use in fastener applying apparatus and more particularly to combined pistons and drivers for use in fastener applying apparatus.

In the application of fasteners, such as staples and nails, it is known to serially feed the fasteners to a drive station beneath a piston and associated driver, such that when pneumatic pressure, for example, is applied over the piston, it is driven to move the driver against the fastener and thus serves to drive the fastener into and through appropriate materials. Such a fastener driving apparatus is disclosed, for example, in U.S. Pat. No. 3,170,487.

Typical fastener applying apparatus operate in a pressure range from about 70 psi to about 120 psi, and the larger or heavier duty apparatus produce an energy of 45 to 50 foot pounds, for example, in the application of fasteners. In such apparatus, the piston and driver unit is subjected to large forces and great stress, particularly at the juncture of the piston to the driver. First, pneumatic pressure is instantaneously applied to the piston, overcoming the inertia of the at-rest piston and driver and driving it downwardly toward a fastener. Engagement of the fastener and subsequent fastener driving exerts stress on the driver and this is transmitted through to the piston. Also, when the piston reaches the bottom of its stroke, it engages an elastomeric stop, abruptly stopping the piston while forward inertia of the driver stresses the piston/driver connection in an opposite direction before the piston is raised for another stroke.

Occasionally, a fastener applying apparatus is dry fired, or operated without driving a fastener, such as where the apparatus is being tested or where the apparatus runs out of fasteners when the fastener supply is depleted. In this case, the piston strikes the elastomeric stop at the end of its stoke with even higher forces, shocking the piston and driver and fatiguing the parts and stressing the components particularly at the connection of piston to driver. Accordingly, these normal operating pressures and energies applied to the piston and its associated driver exert operating forces which, over an extended course of use, can eventually lead to piston or driver failure.

More particularly, it is typical to pin the driver, such as a driver blade, directly to the piston. The driver is surrounded by a boss extending from the piston and accommodating the driver blade, and a pin is inserted through the boss and the driver. It is in the area of the connection of the driver blade to the piston near the pin where failures typically occur as a result of these operating stresses as described above.

Accordingly, it has been one objective of this invention to provide an improved piston and driver combination.

A further objective of the invention has been to provide an improved piston and associated driver which minimizes or dissipates stress generated by operating forces and extends piston and driver life.

As indicated above, the piston and driver in a pneumatic fastener applying apparatus are accelerated to a desired velocity for the purpose of driving a fastener into material. For any particular material and fastener length, a certain velocity is required in order to insure proper driving of the fastener to the proper depth. Accordingly, it will be appreciated that if the piston and driver can be reduced in weight, the energy required to overcome the at rest inertia of the piston and driver is not as great, and less energy can be utilized to obtain the same or greater driver velocities.

Accordingly, it has been another objective of this invention to reduce the weight of a piston and driver combination by the utilization of an improved piston and driver structure, and thus reduce the power required for operating the fastener applying apparatus for a given use.

To these ends, a preferred embodiment of the invention contemplates the utilization of a synthetic piston body, a piston insert, and a driver secured to the piston body by means of the insert. The driver is secured in a manner which dissipates operating stresses over greater areas than that immediately surrounding the driver/piston pin.

In more detail, the piston body includes a circular piston having a centrally located bore therethrough. A lower portion of the bore is threaded while an adjacent upper portion of the bore is tapered, opening upwardly and outwardly from the piston. The top of the piston body comprises a top surface having a relieved area, preferably concentric with the bore therethrough.

The piston insert includes a lower male threaded portion and an upwardly extending frusto-conical portion having the area of smallest diameter adjacent the threaded portion. The insert includes a flared top of greater diameter than the frusto-conical portion. A longitudinal slot extends through the threaded portion and into the frusto-conical portion to a slot end near the flared top. A driver, such as a flat driver blade, having an upper portion shaped similarly to the cross section of the slot through the piston insert, is secured in the piston insert by means of a pin extending through the frusto-conical portion of the piston insert and the upper portion of the driver blade. The top of the driver blade is seated against the slot end adjacent the flared top of the insert.

Preferably, at least the threaded portion of the piston body is slightly undersize with respect to the male threaded portion of the piston insert. Accordingly when the piston insert is screwed into the piston body, the insert is thus squeezed inwardly against the driver blade, serving to frictionally engage the driver blade and to hold the drive blade securely within the insert not only by the pin extending therethrough, but by means of the frictional engagement of the driver applied by the assembly of the insert to the piston body.

The preferred embodiment of the invention produces a number of advantages. Specifically, the frictional engagement of the insert against the driver blade, for example, serves to spread any forces acting on the driver blade, or on the piston or piston insert, over a much greater area than that immediately surrounding the pin. While the pin serves to connect the driver to the insert, it does not bear the entire stress exerted by one part relative to another, and the area of the driver immediately surrounding the pin is not overstressed.

Accordingly, the driver blade is held more securely within the insert and within the piston. The stress in the areas immediately surrounding the pin hole in the driver blade is spread over a greater portion and is relieved, thus reducing fatigue of the driver blade and premature failure.

Moreover, the flared insert top, which seats on the upper portions of the piston body, serves to spread the normal pneumatic operating forces over a substantial area of the piston body, thus distributing the operating forces over the entire structure. This dissipates forces applied to the piston and driver structure over the entire unit and eliminates the concentration of force in any one small area of the piston or insert.

The flared insert top is preferably seated in the corresponding relieved area or recess in the top surface of the piston body. Such relief mounting lowers the final insert position with respect to the piston body. The piston seal, such as an "O-ring", can thus be mounted closer to the piston top, effectively reducing the chamber volume above the piston prior to firing, thereby promoting efficiency.

These and other advantages will be appreciated from the following detailed description of a preferred embodiment of the invention and from the drawings, in which.

Figure 1:
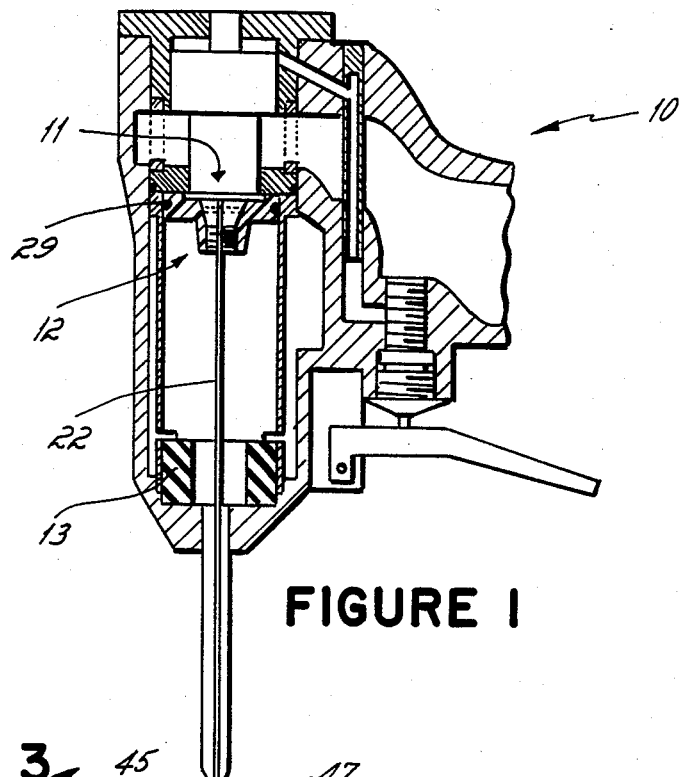
FIG. 1 is a cross-sectional view of a typical fastener driving apparatus showing the piston and driver of the invention.

Turning now to the drawings, there is shown therein a pneumatically operated fastener driving apparatus or gun 10. Such an apparatus can be, for example, a fastener applying apparatus as shown in U.S. Pat. No. 3,170,487 which, apart from the piston and driver as disclosed herein, forms no part of this invention. The illustration of a fastener driving apparatus 10 of FIG. 1 is supplied only for illustrative purposes to show how the piston and driver is generally utilized. Not shown in FIG. 1, of course, is the fastener supplying magazine with which the fastener applying apparatus 10 is utilized.

In use, pressurized fluid, such as air, is introduced into the area 11 above the piston and driver 12 of FIG. 1, whereupon the piston and driver 12 is accelerated downwardly, as viewed in FIG. 1, for the purpose of driving a fastener as is commonly known in the art. Upon reaching the elastomeric bumper 13, the piston and driver 12 is stopped and thereafter is returned to its upper position as shown in FIG. 1 for a repeated fastener driving cycle.

As shown in the drawings, the fastener applying apparatus and the piston and driver apparatus are disposed in a vertical disposition as when driving a fastener downwardly. It will be appreciated that the following description, referring to terms such as "downwardly," "top" or "upwardly," is in regard to this orientation for description purposes, and that the driving apparatus and the piston and driver could be inverted, or disposed horizontally or in other dispositions.

Figure 2:
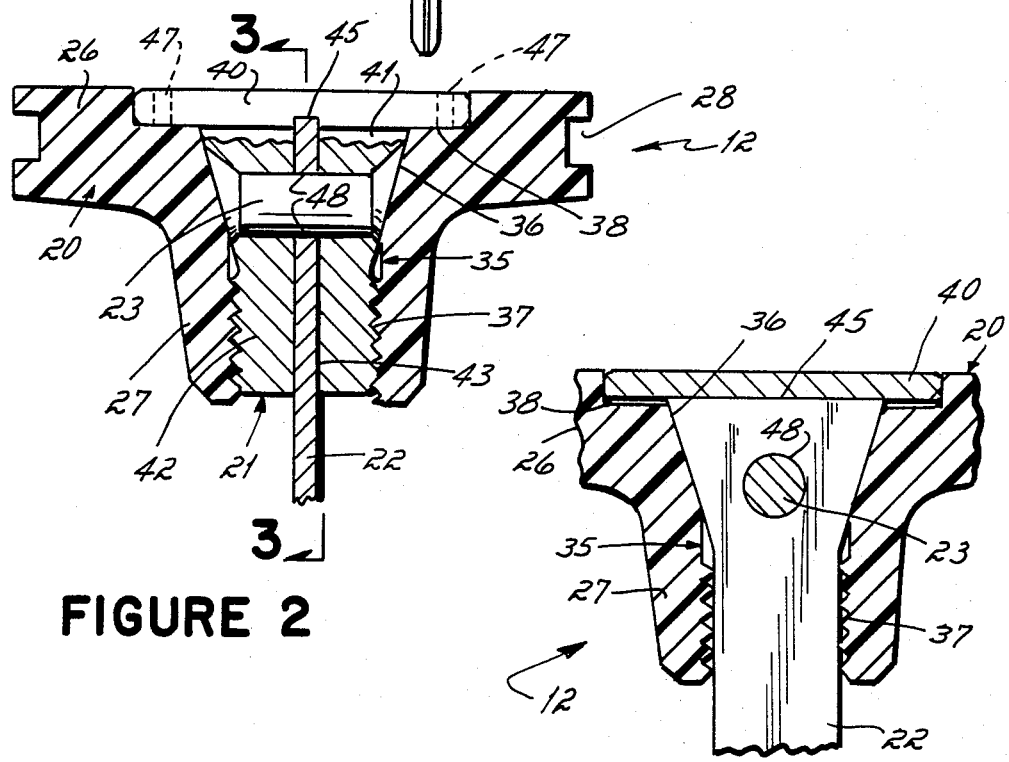
FIG. 2 is an enlarged cross-sectional view of the piston and driver of FIG. 1; and, FIG. 3 is cross-sectional view of the piston and driver, taken along lines 3—3 of FIG. 2.

Turning now to a description of the piston and driver combination 12, attention is directed to FIG. 2 where the piston and driver unit 12 is shown in enlarged detail. The piston and driver 12 includes a piston body 20, a piston insert 21, a driver blade 22, and a pin 23. The piston body 20 preferably comprises a disc-like portion 26 and a downwardly extending boss portion 27. A circumferential groove 28 is provided around the disc-like portion 26 for the receipt of an O-ring seal 29 (shown in FIG. 1 only). Such a seal functions to seal the piston against the cylinder walls of the fastener applying apparatus.

The piston body 20 also includes an interior passageway or bore 35 comprising an upwardly opening tapered bore 36 and a threaded bore 37 extending downwardly from the upwardly tapering bore 36. The top surface of the piston body 20 also includes a circular recess 38, the function of which will be further described.

The piston insert 21 includes a flared top 40, a frusto-conical tapered portion 41 extending downwardly and tapering inwardly from the flared top 40, and a straight threaded portion 42. The insert 21 is slotted or bifurcated, as shown in FIG. 2, effectively splitting the insert, through the threaded and frusto-conical portions, into two semi-cylindrical or semi-frusto-conical legs. Such a slot or bifurcation is depicted at 43.

Figure 3:
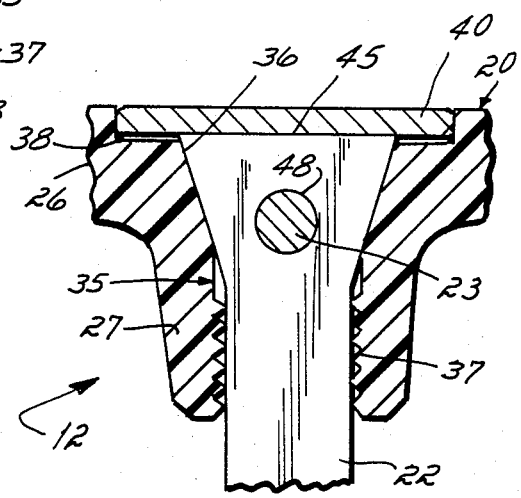

The driver or driver blade 22 has a top end 45 which conforms substantially to the cross-sectional shape of the piston insert 21. This relationship is best seen in FIG. 3, where it will be appreciated that the top end 45 of the driver blade 22 rests against the flared top 40 of the piston insert 21.

While the components of the piston may be manufactured of any suitable material, one material which may be found suitable for the piston body is a polyester elastomer material manufactured by the DuPont corporation under its trademark "HYTREL", Type No. 6345. This material has good overall shock resistance. The piston insert may comprise mild or hot-rolled No. 1020 steel, carbon nitrited for case hardening, while the driver blade may consist of spring steel such as No. 6150 alloy steel.

In accordance with the invention, the threaded bore 37 of the boss 27 of the piston body 20 is slightly smaller in diameter than the corresponding straight threaded portion 42 of the piston insert 21. Moreover, it will be appreciated that the tapered surfaces of the frusto-conical portion 41 of the piston insert 21 are shaped in substantial conformance with the tapered shape of the upwardly opening bore 36 in the piston body 20.

When the piston and driver are assembled, the upper or top end 45 of the driver blade 22 is inserted into the slot 43 of the piston insert 21, such that the top end 45 of the driver blade 22 preferably rests on the flared top 40. It will be appreciated that it is desirable to provide as much driver blade material as possible above the pin 23 to strengthen the blade in this area. Therefore, and depending upon the particular size of the piston and piston insert, and the location of the pin 23, the flared top 40 may be slotted to a desired depth for reception of the top end 45 of the driver blade 22. This will permit a significant amount of driver blade material to be disposed above the pin 23, serving to reduce fatigue of the driver blade above the pin. Stress in this area would occur, for example, when the piston and driver are driven downwardly and the driver blade 22 tends to continue its forward motion after the piston body 20 has been stopped, such as by engaging an abutment or stop in the fastener driving apparatus.

Once the driver blade 22 is inserted into the piston insert 21, the piston insert 21 is screwed into the piston body 20. Since the threaded bore 37 is slightly undersized with respect to the straight threaded portion 42 of the piston insert, this assembly step functions to squeeze the bifurcated legs of the piston insert 21 together and tightly against the driver blade 22, thus enhancing the frictional engagement of the insert 21 on the driver blade 22. Continued motion of the piston insert 21 into the piston body 20 from above seats the piston insert 21 in the passage 35. The frusto-conical surfaces of the piston insert 21 engage the tapering passage or bore 36 and serve to further squeeze the piston insert 21 against the driver blade 22.

When the piston insert 21 is fully seated in the piston body 20, it is preferable that the flared top portion 40 reside within the recess 38 of the piston body 20, rather than extend above it. This eliminates any projections above the top surface of the piston body 20 and permits the groove 28 to be located as high as possible on the piston body 20, thereby effectively reducing the volume of the expansible chamber above the piston and promoting driving efficiency and initially piston acceleration, as will be well appreciated.

It will also be appreciated that the taper of the upwardly opening bore 36 and the taper of the frusto-conical surfaces 41 of the insert 21 are approximately 15° from the vertical as shown in the drawings. Such an inclination is suitable for promoting the inward motion of the bifurcated legs of the insert 21 against the driver blade 22, while at the same time reducing the amount of plastic material which must be removed in order to form the insert-receiving passageway. The utilization of as much plastic as possible contributes to the overall strength of the piston body and, while other taper angles could be selected, approximately 15° is believed to be preferable. Also, this tapered engagement serves to dissipate forces exerted on the insert over a large portion of the piston body.

It will also be appreciated that the flanged or flared top 40 of the piston insert 21 extends outwardly from the passage 35 and lies over a substantial portion of the piston body, within recess 38. Accordingly, when pneumatic pressure is introduced over the piston, the pneumatic pressure operating on the flared top 40 is dissipated by the flared top as well as by the tapered portion of the insert over a substantial portion of the piston body 20 and the downward pneumatic stress is not exerted just on the insert 21 with respect to the piston, but over the piston body 20 as well, thus reducing any tendency for the piston insert 21 to drive through the piston body 20, for example.

In connection with assembling the piston insert 21 to the piston body 20, it will be appreciated that the flared top 40 of the insert 21 may be configured in any form so as to permit the application of a tool for screwing the insert 21 into the piston body 20. As shown in FIG. 2, spanner holes 47 are provided in the flared top 40 for a spanner wrench to screw the insert into the piston body 20. Other means could be utilized for this purpose as well.

It will be appreciated that in use, when the piston and driver are driven downwardly, the driver blade 22 will engage a fastener and drive it into or through target material. As the piston is driving downwardly with the driver in engagement with the fastener, downward forces are exerted both on the top of the piston insert 21 and the piston as well. This force is resisted by reciprocal forces produced by engagement of the driven fastener. These reciprocal forces are transmitted through the driver blade 22 to the piston insert 21 by means of the frictional engagement of the insert 21 on the driver blade 22 and by means of the engagement of the driver blade top 45 at the top end of the piston insert 21. Also, such forces may be at least partially borne by the engagement of the driver blade 22 with the pin 23 around the bore surfaces 48 in the blade 22. Due to the frictional engagement of the driver blade 22 by the insert 21, and the direct top engagement of driver to insert, however, the forces are spread over a substantially larger area than that area which immediately surrounds the bore 48 in the driver blade 22. Thus, stress on the driver blade 22 is dissipated away from any particular focal point, thereby increasing the life and the resistance to fatiguing of the driver blade 22. As a result, the portion of driver blade 22 immediately surrounding the pin 23 is not over-stressed.

Once the piston is driven to its downward position and engages, for example, the elastomer bumper 13, the piston body insert 21 and driver blade 22 would normally be expected to incur shock from the abrupt stopping of the inertia of the unit. Rather than having the entire shock borne by the pin 23 and the area of the driver blade immediately around the pin 23, the piston of this invention tends to dissipate these forces over the entire top portion of the driver blade 22, including that portion which is frictionally engaged by the piston insert 21, thereby relieving highly concentrated stress at the bore 48 immediately surrounding the pin 23. This structure thus serves to dissipate fatiguing stress over a large area and promotes component life.

It will also be appreciated that the piston, being manufactured, at least in its body, from a synthetic material, can be manufactured at a reduced weight. Such a reduced weight or mass translates into a reduced inertia which must be overcome to accelerate the piston to a desired driving velocity. Therefore, once the fastener driving force is calculated, it will be appreciated that less pneumatic force is required to produce a given driving velocity to drive a given fastener in a given material, as compared with pistons of greater weight. This results from the quicker acceleration of the piston and driver of the invention. At the same time, the improved piston and driver as disclosed serves to dissipate fatiguing forces over the entire piston and driver structure and thus the life of both the piston and driver components is improved.

These and other advantages and modifications will become readily apparent to those of ordinary skill in the art, without departing from the scope of this invention, and the applicant intends to be bound only by the claims appended hereto.

I claim:

1. A piston and fastener driver for use in fastener driving apparatus and comprising:
    a piston body having a threaded bore and an outwardly tapering bore extending from said threaded bore;
    a piston insert disposed in said threaded bore and said tapering bore and including a threaded male portion threaded into said threaded bore, and a frusto-conical portion having cooperating surfaces engaging said tapering bore;
    a longitudinal slot in said insert through said threaded male portion and said frusto-conical portion; and,
    a driver disposed in said slot, said insert frictionally engaging and holding said driver, with said driver extending from an end of said insert opposite said frusto-conical portion.

2. A piston and fastener driver as in claim 1, wherein said driver comprises a driver blade having a top portion with edges conforming to the frusto-conical shape of said frusto-conical portion of said insert.

3. A piston and fastener driver as in claim 1, wherein said threaded bore is undersize with respect to said threaded male portion such that said insert is squeezed onto said driver when said insert is threaded into said piston.

4. A piston and fastener driver as in claim 3, wherein said tapered bore in said piston body is undersize with respect to said frusto-conical portion of said insert.

5. A piston and fastener driver as in claim 3, wherein said insert includes a flared top having a greater diameter than said frusto-conical portion, said slot extending through said insert at least to said flared top.

6. A piston and fastener driver as in claim 5, including a transverse bore through said frusto-conical portion, and said driver, and a pin means disposed in said transverse bore for holding said driver in said slot and in said insert.

7. A piston and fastener driver as in claim 5, wherein said piston has a relieved area in said top surface, and said flared top of said insert is disposed within said relieved area of said top surface.

8. A fluid driven piston and fastener driver for use in fastener driving apparatus, said piston and driver including:
- a piston body having an upper side and an underside, an upwardly opening tapered bore extending therethrough and open to the upper side of said piston, a threaded bore beneath and in communication with said bore, and said piston body being movable in one direction from one position to a second position upon application of expanding fluid to said top side;
- an integral piston insert removably disposed and threaded into said threaded bore within said piston body
- a fastener driver interconnected and fixed to said insert and extending away from said piston body and said insert in said one direction;
- said insert comprising a flared top, of greater diameter than the remainder of said insert, engaging said upper side of said piston.

9. Apparatus as in claim 8, wherein said piston body is elastomeric.

10. A piston and fastener driver as in claim 8, wherein said includes bore extends through said piston body and has a tapered portion of greater diameter at said upper side of said piston than within said piston, and wherein said insert includes a frusto-conical portion extending from said flared top in said one direction and tapering inwardly from said flared top.

11. A piston and fastener driver as in claim 14, wherein portions of said flared top, said frusto-conical portion and said threaded male portion of said piston insert each operatively engage respective surfaces of said piston for securing said insert and said driver in and to said piston.

12. A piston and fastener driver as in claim 11, wherein said insert is slotted and said driver blade is disposed within said slot and extends outwardly from said piston and wherein said threaded bore of said piston is undersize with respect to said threaded male portion of said insert, said threaded male portion squeezing said slot against said driver blade when said insert is screwed into said piston.

13. Apparatus as in claim 12, wherein said piston body is elastomeric.

14. A piston and fastener as in claim 10, wherein said frusto-conical portion includes surfaces engaging and seating in said tapered bore.

15. A piston and fastener driver as in claim 14, wherein said insert is slotted and said driver comprises a blade having an upwardly flared top portion disposed in said slot and conforming to the approximate shape of said frusto-conical portion of said insert in areas adjacent to the surfaces thereof.

16. A piston and fastener driver as in claim 15, including a transverse bore through the frusto-conical portion of said insert and the flared top portion of the blade disposed therein.

17. A piston and fastener driver as in claim 16, including a pin in said transverse bore securing said blade to said insert.

18. A piston and fastener driver as in claim 17, wherein said slot terminates proximate said flared top of said insert and said driver top flared portion engages the underside of said flared top of said insert.

19. A piston and fastener driver as in claim 8, including a relieved area in said piston upper side, said flared top of said insert being disposed within said relieved area such that said flared top is flush with the upper side of said piston body.

* * * * *

UNITED STATES PATENT AND TRADEMARK OFFICE
CERTIFICATE OF CORRECTION

PATENT NO. : 4,530,455

DATED : July 23, 1985

INVENTOR(S) : George F. Vornberger

It is certified that error appears in the above-identified patent and that said Letters Patent is hereby corrected as shown below:

Col. 1, line 39, "stoke" should be --stroke--

Col. 2, line 62, "surronding" should be --surrounding--

Col. 7, line 41, claim 10, delete "includes"
 (per Examiner's Amendment)

Signed and Sealed this

Twenty-second Day of October 1985

[SEAL]

Attest:

DONALD J. QUIGG

Attesting Officer

Commissioner of Patents and
Trademarks—Designate